Patented June 11, 1935

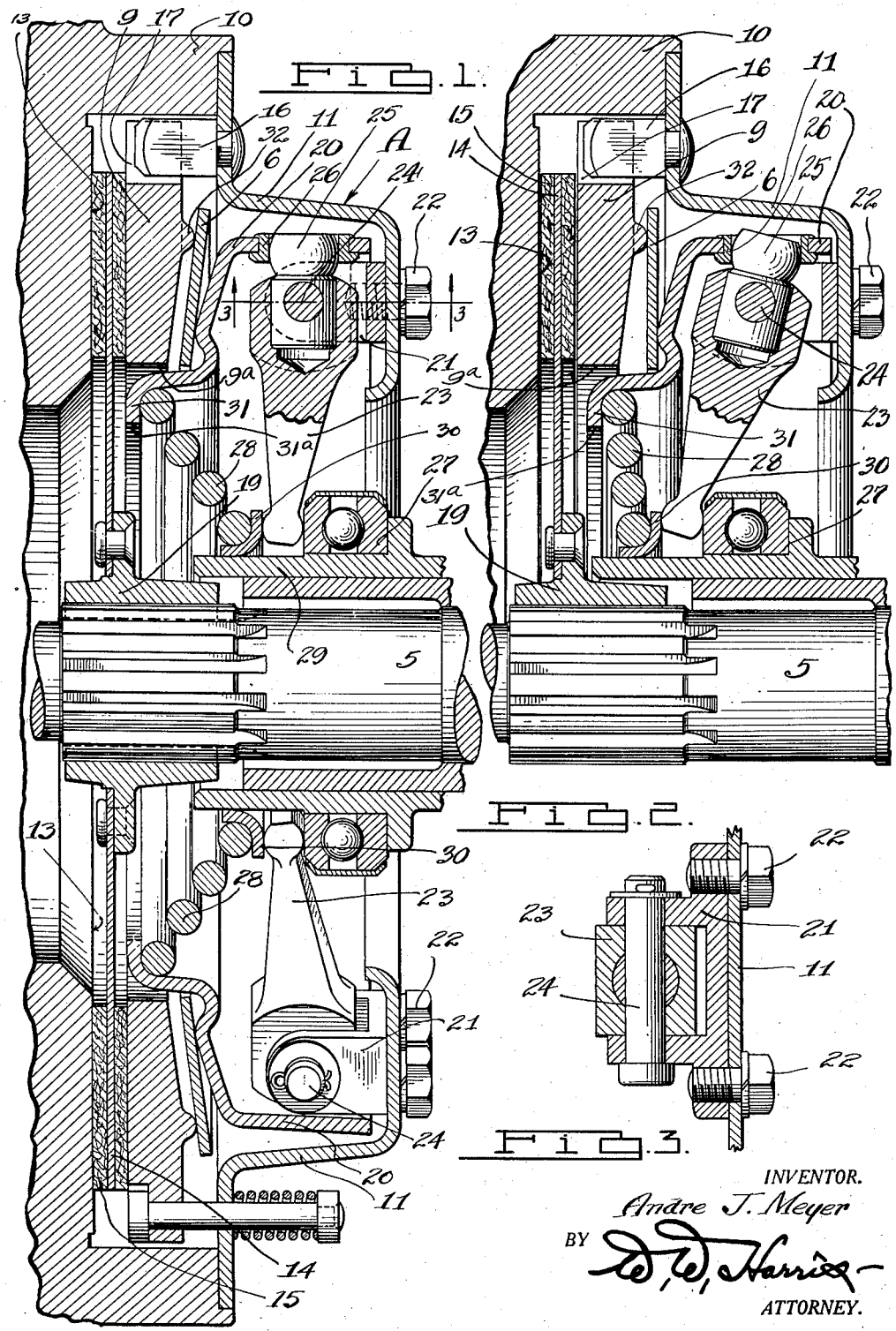

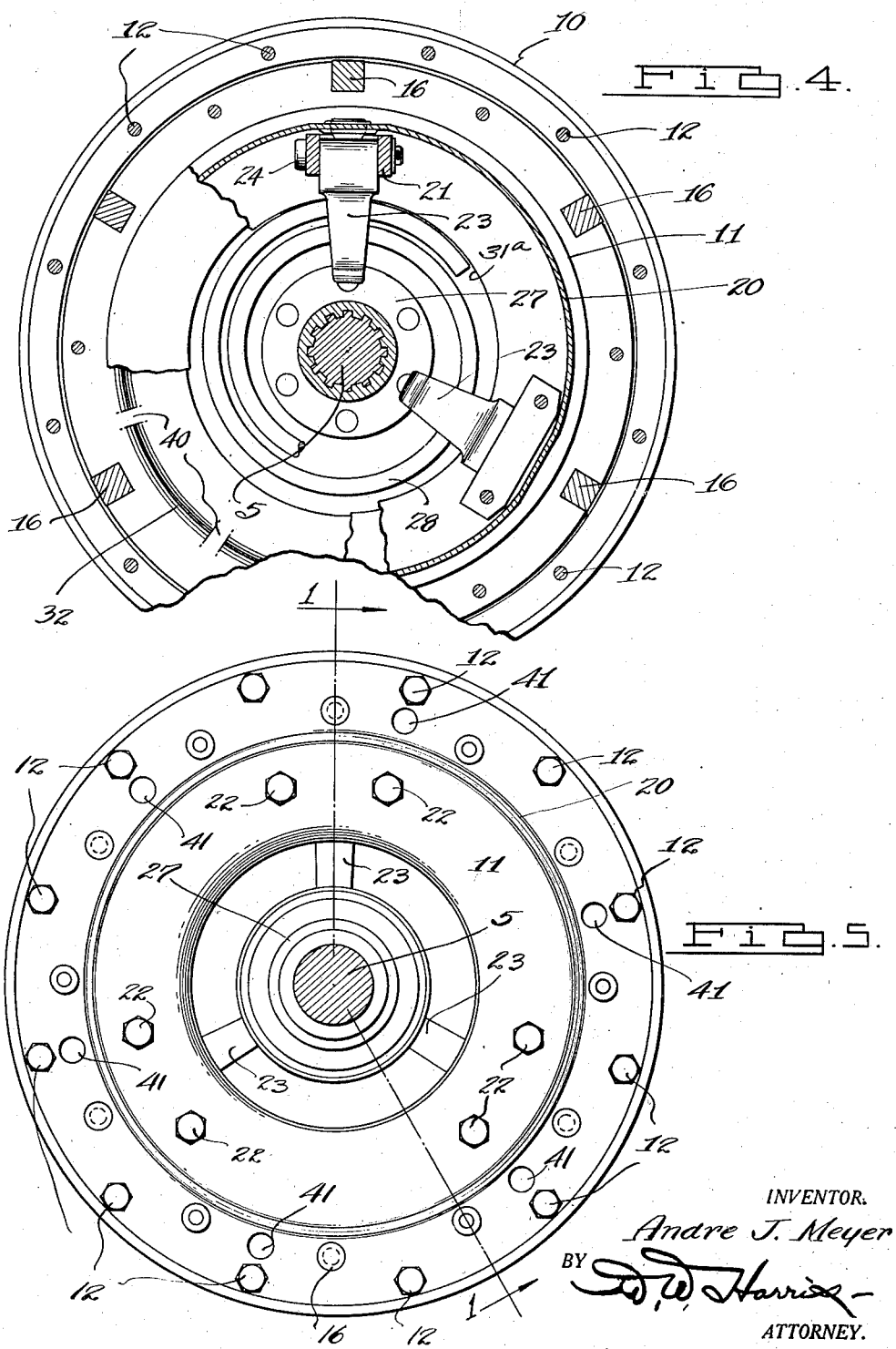

2,004,291

UNITED STATES PATENT OFFICE 2,004,291

CLUTCH

Andre J. Meyer, Detroit, Mich., assignor to Continental Motors Corporation, Detroit, Mich., a corporation of Virginia Application December 8, 1930, Serial No. 500,717

20 Claims. (Cl. 192—52)

This invention relates to clutches and more particularly to clutches adapted for association with automobiles and other like vehicles though obviously the principles of this invention may be embodied in machines other than automobiles and the like.

It is an object of this invention to minimize manufacturing costs by providing a clutch of simple construction which may be readily manufactured and assembled with a minimum of time and labor and which is composed of a minimum number of parts.

Another object of this invention is to construct an improved clutch structure by providing a clutch device, employing a yielding means adapted for loading a pressure multiplying lever means and for loading a driving means independently of the lever means, with means effecting a gradual engagement between the driving and driven means.

A further object of this invention is to increase the efficiency of a clutch by providing primary and secondary yielding means and means cooperating therewith for transmitting a substantially uniformly increasing pressure from the primary yielding means to the pressure plate or driving means of the clutch throughout the range of clutching action.

For a more detailed understanding of the invention reference may be had to the accompanying drawings which illustrate one embodiment of the invention, and in which:

Figure 1 is a longitudinal sectional view through a clutch constructed in accordance with my invention and taken substantially on the line 1—1 of Figure 5, Figure 2 is a fragmentary sectional view of a clutch illustrating the arrangement of parts when the clutch is in a released position, Figure 3 is a detail sectional view through the means for supporting the lever and taken on the line 3—3 of Figure 1, Figure 4 is a rear end view of the clutch with portions thereof broken away in order to illustrate the interior construction, and Figure 5 is a rear end view of the clutch.

In general the power transmitting devices employed in automobiles and other vehicles of like character are usually assembled adjacent one end of the power plant or engine and are preferably associated with a driving member or flywheel 10. The flywheel is provided with a recessed portion in the rear face thereof adapted for partially housing a clutch mechanism A, said clutch mechanism being preferably carried as a unitary structure with a clutch housing 11 which is adapted to be secured by means of bolts or other fastening devices 12 to the rim of the flywheel 10. Preferably the flywheel or driving member is provided with a machined face 13 adapted for engagement with the clutch disc 14 said clutch disc being preferably provided with facing material 15 for frictionally engaging the face of the flywheel and operatively connected with a driven member such as a drive shaft 5. The clutch assembly A includes a driving means or pressure plate 9 which is relatively movable with respect to the flywheel or driving member and is preferably driven by the flywheel through the agency of driving lugs 16, said lugs being carried preferably by the housing 11 and engaged in slots 17 carried by the pressure plate. The clutch disc 14 may be referred to as the driven means and is connected in driving engagement with the driven member or shaft 5 said disc being riveted or otherwise secured to a hub structure 19 that is splined to the shaft 5.

The embodiment of the invention illustrated in the accompanying drawings, preferably provides a thrust means 20 preferably axially positioned with respect to the driving means or pressure plate 9. The housing 11 is preferably provided with a bracket 21 which may be secured thereto by means of bolts or other fastening devices 22, this bracket constructed to pivotally support a lever 23 by means of the pin 24, and preferably there is provided a plurality of said levers, each lever being preferably supported on the housing structure by separate brackets.

One end of each lever is preferably constructed substantially with a ball portion 25 adapted for engagement in a bushing 26 carried by the thrust member as illustrated in Figure 1. This lever means may be constructed as shown in the drawings with a removable ball portion thereof, though in many instances it may be found desirable to employ a one-piece lever. The other end of the lever engages a suitable clutch releasing means or collar 27.

In order to provide means for engaging the driving and driven means of the clutch assembly a yielding means or spring 28 is provided, this spring consisting preferably of a spiral coil spring which is positioned intermediate one end of the lever means and the thrust means. Preferably the sleeve 29 of the clutch releasing means is extended inwardly of the clutch assembly and supports a washer or spring retainer 30 constructed and adapted to be engaged by the inner ends of the levers. The other end of the spiral coil spring sets on an inwardly extending flange 31 carried by the thrust means and it may be thus noted that the spring is adapted for loading the lever and for loading the thrust means. The flange 31 constitutes an annular spring abutment positioned within an opening 9a in the pressure plate 9, the abutment also having an opening 31a. The driven shaft 5 extends through the openings 9a and 31a. Preferably the lever is constructed to multiply the pressure or loading of the spring 28 and in the specific structure illustrated in the drawings the lever means is provided with approximately a 5 to 1 ratio. For example, a spring employed with the illustrated embodiment of the invention is constructed to exert a force of approximately 200 lbs. directly on the thrust means. The other end of the spring which engages the lever means exerts a like force on the inner end of the lever and because of the arrangement and construction of the lever a force of approximately 1,000 lbs. is transmitted from the lever to the thrust means through the ball connection 25. Thus a total of 1,200 lbs. pressure is adapted for application to the driving means of the clutch for engaging the driving and driven means together in driving relation.

The spiral coil spring 28 may be termed a primary yielding means and a secondary yielding means 6 is disposed intermediate the thrust means and driving means, this secondary means comprising a flat conoidal spring member or spring annulus. Said conoidal spring member is engaged by the thrust means and the annulus is engaged with an annular rib or raised portion 32 carried on the rear face of the driving means and located substantially in the central zone thereof. Thus the pressure exerted by the primary yielding means is transmitted to the driving means through the agency of the yieldable conoidal spring member and the load is so applied as to exert said pressure during the clutching action on the central zone portion of the driving means. The conoidal spring member above described is adapted to be deflected in response to the primary yielding means to effect a gradual engagement of the driving and driven means by transmitting a substantially uniformly increasing pressure from the primary yielding means to the pressure plate or driving means throughout substantially the range of the clutching action. The action of the conoidal spring member may be plainly seen by referring to Figures 1 and 2, Figure 2 illustrating the clutch parts in a released position, in which the conoidal spring member is subjected to substantially no load. It will be noted that the said conoidal spring member is not deflected. As the clutch collar or clutch releasing means is released the primary spring is released and the conoidal spring member is deflected into a position shown in Figure 1, thus providing a substantially uniformly increasing pressure for gradually engaging the driving and driven means together.

It may be noted that the conoidal spring member or annulus is supported intermediate the thrust member and pressure plate, the annular rib 32 carried by the pressure plate engaging said conoidal spring member adjacent the outer periphery thereof while the thrust member is constructed to engage the opposite face of the conoidal spring member adjacent the inner periphery thereof. It may be further noted that the conoidal spring member when deflected under the load of the primary yielding means, will not be deflected an amount, when the clutch is in full engagement, sufficient to engage the inner peripheral portion of the same with the rear face of the pressure plate or driving means (see Fig. 1). Thus the conoidal spring member or secondary yielding means exerts a force on the thrust member in opposition to an equal force exerted by the primary yielding means, the said thrust member being balanced by these opposed forces, and the said conoidal spring or secondary yielding means transmits the full load from the primary yielding means for effecting a normal clutching engagement of the driving and driven means of the clutch.

On releasing the clutch, the secondary yielding means is de-energized and the primary yielding means is compressed or energized to some further pressure. When the clutch is fully released as illustrated in Figure 2, the secondary yielding means or conoidal spring member is preferably fully de-energized and exerts substantially a zero pressure on said pressure plate. As the clutch is let in, the primary spring is partially de-energized, the relieved energy being transmitted to the secondary yielding means. The pressure of the secondary spring is thus substantially uniformly increased throughout substantially the entire range of the clutching action until the desired full pressure is obtained for fully engaging the driving and driven means in normal clutching engagement. Generally, it is desired to apply a total pressure of approximately 1,200 pounds to the pressure plate, and this pressure is built up at a uniform rate in the secondary yielding means from substantially zero to the desired maximum of approximately 1,200 pounds without any abrupt changes in pressure application preferably substantially over the entire range of the clutching action.

The primary yielding means, which in this case is illustrated as a coiled spiral spring 28, is a low rate spring, while the secondary yielding means here illustrated as a conoidal spring member or annulus 6, is a high rate spring, the definition of "rate" being the deflection per inch of spring travel. A slow rate primary spring is necessary in order to relieve excessive pressures resisting manual release of the clutch since the pressure in such a slow rate primary spring will build up relatively slowly on releasing the clutch, so that in its final position its total exerted pressure may be in the neighborhood of only 1,300 to 1,500 pounds, this final pressure being readily attained in practice by means of the leverage intermediate the clutch releasing means and the spring.

Since the conoidal spring member does not contact with the sloping rear face of the driving means when the clutch is in full engagement, air may circulate between the conoidal spring member and pressure plate or driving means. In order to permit this air to pass out, the annular rib 32 carried by the driving means or pressure plate is provided with spaced slots 40 and the housing structure 11 is provided with a plurality of holes or perforations 41 permitting the air to pass from the inside of the clutch assembly to the outside thus effectively cooling the clutch parts.

It may be further noted that the clutch arrangement herein illustrated may be very readily assembled and economically manufactured.

The thrust means is constructed substantially cup-shaped and opens outwardly the yielding means or spring 28 engaged with the bottom of the cup member and the levers engaged preferably with the side walls thereof. The clutch housing 11 is also constructed substantially cup-shaped and opens inwardly, the said cup shaped thrust means telescoped within the clutch housing as illustrated. It will be noted that the clutch housing is substantially circular and the external surface thereof is not provided with any projecting portions or bosses or complicated recesses as is usually the case with housings for other clutch structures now usually employed with automobiles or other like vehicles.

It will be noted that the bracket 21 for supporting the lever means is carried on the back of the housing structure 11 but obviously various means may be employed for supporting the lever and the structure herein illustrated only shows one embodiment of the invention which is preferably applicable to the construction herein illustrated.

Although but one form of the invention has been illustrated and but a single application thereof has been described in detail, it will be apparent to those skilled in the art to which the invention pertains that various modifications and changes may be made therein without departing from the spirit of the invention or from the scope of the appended claims.

What I claim as my invention is:

1. In a clutch, the combination of driving and driven members, driving and driven means respectively connected in driving engagement with said driving and driven members, thrust means, lever means operatively connected with the thrust means, primary yielding means acting between thrust means and said lever means, and secondary yielding means intermediate said thrust means and driving means constructed to transmit the full load of said primary yielding means for effecting normal clutching engagement between said driving and driven means.

2. In a clutch, the combination of driving and driven members, driving and driven means respectively connected in driving engagement with said driving and driven members, thrust means, lever means operatively connected with said thrust means, primary yielding means adapted for loading said lever means and for loading said thrust means, and secondary yielding means generally located intermediate said thrust means and driving means for transmitting a substantially uniformly increasing pressure to said driving means throughout substantially the entire range of the clutching action.

3. In a clutch, the combination of driving and driven members, driving and driven means respectively connected in driving engagement with said driving and driven members, thrust means, lever means operatively connected with said thrust means, primary yielding means adapted for loading said lever means and for loading said thrust means, and a conoidal spring means generally located intermediate said thrust means and driving means and yieldingly deflected in response to said primary yielding means for effecting a gradual engagement between said driving and driven means.

4. In a clutch, the combination of driving and driven members, a driving pressure plate and a driven disc respectively connected in driving engagement with said driving and driven members, a cup shaped thrust member separate from the pressure plate and opening outwardly, a cup shaped clutch housing opening inwardly and telescopically associated with said thrust member, lever means supported inwardly of said housing and engaged with said thrust member, and yielding means intermediate said thrust member and lever means and adapted for loading said lever means to yieldingly engage said pressure plate and driven disc.

5. In a clutch, the combination of driving and driven members, driving and driven means respectively connected in driving engagement with said driving and driven members, a cup shaped thrust member opening outwardly, a cup shaped clutch housing opening inwardly and telescopically associated with said thrust member, lever means supported inwardly of said housing and engaged with said thrust member, and yielding means generally located intermediate said thrust member and lever means and adapted for loading said lever means and for loading said thrust member independently of said lever means to engage the driving and driven means.

6. In a clutch, the combination of driving and driven members, driving and driven means respectively connected in driving engagement with said driving and driven members, said driving means provided with an annular rib located substantially in the central zone thereof, an annular thrust member, primary yielding means acting on said thrust member, and a spring annulus intermediate said thrust member and said driving means and adapted to be deflected in response to the primary yielding means, said spring annulus adapted for engagement with the annular rib carried by said driving means for substantially transferring a substantially uniformly increasing pressure to the central zone of the driving means substantially throughout the entire range of the clutching action.

7. In a clutch, the combination of driving and driven members, driving and driven means respectively connected in driving engagement with said driving and driven members, said driving means provided with an annular rib located substantially in the central zone thereof, an annular thrust member, primary yielding means acting on said thrust member, and a spring annulus intermediate said thrust member and said driving means and adapted to be deflected in response to the primary yielding means, said spring annulus adapted for engagement with the annular rib carried by said driving means for substantially transferring the pressure to the central zone of the driving means during the clutching action, said annular rib having one or more spaced slots providing air passages.

8. In a clutch, the combination of driving and driven members, driving and driven means respectively connected in driving engagement with said driving and driven members, said driving means provided with an annular rib located substantially in the central zone thereof, an annular thrust member, primary yielding means acting on said thrust member, a spring annulus intermediate said thrust member and said driving means and adapted to be deflected in response to the primary yielding means, said spring annulus adapted for engagement with the annular rib carried by said driving means for substantially transferring the pressure to the central zone of the driving means during the clutching action, said annular rib having one or more spaced slots providing air passages, and a housing having air outlet openings.

9. In a clutch, the combination of a driving flywheel and driven shaft, a driven disc carried by said shaft, a pressure plate having an opening receiving said shaft, levers driven by said flywheel having their inner ends surrounding said shaft, an abutment within said plate opening, and yielding means acting on said abutment and said lever ends.

10. In a clutch, the combination of a driving flywheel and driven shaft, a driven disc carried by said shaft, a pressure plate having an opening receiving said shaft, levers driven by said flywheel having their inner ends surrounding said shaft, a thrust member actuated by the outer ends of said levers and having an inner extension within said plate opening forming an abutment, said thrust member adapted to load the pressure plate, and yielding means acting intermediate the abutment and said inner lever ends.

11. In a clutch, the combination of a driving flywheel and driven shaft, a driven disc carried by said shaft, a pressure plate having an opening receiving said shaft, levers driven by said flywheel having their inner ends surrounding said shaft, a thrust member actuated by the outer ends of said levers and having an inner extension within said plate opening forming an abutment, said thrust member adapted to load the pressure plate, and yielding means acting intermediate the abutment and said inner lever ends, and a secondary yielding means intermediate the thrust member and pressure plate.

12. In a clutch, the combination of a driving flywheel and driven shaft, a driven disc carried by said shaft, a pressure plate having an opening receiving said shaft, levers driven by said flywheel having their inner ends surrounding said shaft, an abutment within said plate opening, and yielding means acting on said abutment and said lever ends, said abutment having an opening receiving said shaft.

13. In a clutch, the combination of a driving flywheel and driven shaft, a driven disc carried by said shaft, a pressure plate having an opening receiving said shaft, levers driven by said flywheel having their inner ends surrounding said shaft, a cupped member opening outwardly from the pressure plate and having a portion thereof providing an abutment, and yielding means acting on said abutment and said lever ends.

14. In a clutch, the combination of a driving flywheel and driven shaft, a driven disc carried by said shaft, a pressure plate having an opening receiving said shaft, levers driven by said flywheel having their inner ends surrounding said shaft, a cupped member opening outwardly from the pressure plate and having a portion thereof providing an abutment, a cupped housing carried by the flywheel and opening inwardly toward the pressure plate, and yielding means acting on said abutment and said lever ends.

15. In a clutch, the combination of a driving flywheel and driven shaft, a driven disc carried by said shaft, a pressure plate having an opening receiving said shaft, levers driven by said flywheel having their inner ends surrounding said shaft, a cupped member opening outwardly from the pressure plate and having a portion thereof providing an abutment, a cupped housing carried by the flywheel and opening inwardly toward the pressure plate, and yielding means acting on said abutment and said lever ends, and means carried by and within said cupped housing for fulcruming said levers.

16. In a clutch, the combination of a driven shaft and a disc connected thereto, a driving pressure plate for loading the disc, said plate having a projection extending outwardly therefrom away from the disc at substantially the mid-section of the disc, thrust means for said plate acting on said projection, and lever means acting on said thrust means.

17. In a clutch, the combination of a driven shaft and a disc connected thereto, a driving pressure plate for loading the disc, said plate having a projection extending outwardly therefrom away from the disc at substantially the mid-section of the disc, yielding means for loading the pressure plate, means for separating the pressure plate from the disc, and an annulus intermediate the pressure plate and disc, said annulus having its outer circumferential edge acting on said projection.

18. In a clutch, the combination of a driven shaft and a disc connected thereto, a driving pressure plate for loading the disc, said plate having a projection extending outwardly therefrom away from the disc at substantially the mid-section of the disc, yielding means for loading the pressure plate, means for separating the pressure plate from the disc, and an annulus intermediate the pressure plate and disc, said annulus having its outer circumferential edge acting on said projection, and a thrust member positioning the inner circumferential edge of said annulus.

19. In a clutch, the combination of a driving pressure plate and associated driven element, said plate having a projection rearwardly thereof at substantially the mid-section, thrust means acting on said projection to provide substantially uniform pressure around said plate, and lever means acting on said thrust means.

20. In a clutch, the combination of a driving flywheel and driven shaft, a driven disc carried by said shaft, a pressure plate having an opening receiving said shaft, levers driven by said flywheel having their inner ends surrounding said shaft, a cupped member opening outwardly from the pressure plate and having a portion thereof providing an abutment, a cupped housing carried by the flywheel and opening inwardly toward the pressure plate, and yielding means acting on said abutment and said lever ends, said cupped member and cupped housing being relatively spaced radially of said shaft and overlapping longitudinally of said shaft.

21. In a clutch, a driving member, a driving pressure plate, a driven shaft, a driven disc, means including a spring for loading the pressure plate, releasing means for the pressure plate including lever means engaged by one end of said spring and a pair of cupped members one providing an abutment for the other end of said spring and the other providing a housing for the clutch.

22. In a clutch, a driving member, a driving pressure plate, a driven shaft, a driven disc, means including a spring for loading the pressure plate, releasing means for the pressure plate including lever means engaged by said spring, and a pair of relatively overlapping cupped members one providing an abutment for the spring and the other providing a housing for the clutch and having a lever fulcrum means.

23. In a clutch, a driving member, a driving pressure plate, a driven shaft, a driven disc, means including a spring for loading the pressure plate, releasing means for the pressure plate including lever means engaged by said spring, and a pair of relatively overlapping oppositely cupped members one providing an abutment for the spring and the other providing a housing for the clutch, said spring located intermediate said lever means and said first mentioned cupped member.

24. In a clutch, the combination of a driving flywheel and driven shaft, a driven disc carried by said shaft, a pressure plate around said shaft, lever means driven by said flywheel and having their ends surrounding said shaft, fulcrum means for said lever means, an inwardly cupped cover plate, an outwardly cupped member located in position by said lever means, and yielding means intermediate said outwardly cupped member and said lever means.

25. In a clutch, the combination of a driving flywheel and driven shaft, a driven disc carried by said shaft, a pressure plate around said shaft, levers driven by said flywheel having their ends surrounding said shaft, fulcrum means for said levers, yielding means adapted to actuate said levers for moving said pressure plate, and means separate from said pressure plate and overlapping same axially of said shaft for providing an abutment for said yielding means.

26. In a clutch, the combination of a driving flywheel and driven shaft, a driven disc carried by said shaft, a pressure plate around said shaft, levers driven by said flywheel having their ends surrounding said shaft, fulcrum means for said levers, yielding means adapted to actuate said levers for moving said pressure plate, and an outwardly cupped member separate from said pressure plate and overlapping same axially of said shaft for providing an abutment for said yielding means.

27. In a clutch, the combination of a driving flywheel and driven shaft, a driven disc carried by said shaft, a pressure plate around said shaft, levers driven by said flywheel having their ends surrounding said shaft, fulcrum means for said levers, yielding means adapted to actuate said levers for moving said pressure plate, said yielding means including a spring engaging the inner ends of said levers, and an outwardly cupped member separate from said pressure plate and overlapping same axially of said shaft for providing an abutment for said yielding means.

28. In a clutch, the combination of a driving flywheel and driven shaft, a driven disc carried by said shaft, a pressure plate around said shaft, levers driven by said flywheel having their ends surrounding said shaft, fulcrum means for said levers, yielding means adapted to actuate said levers for moving said pressure plate, said yielding means including a spring engaging the inner ends of said levers, and an outwardly cupped member engaging the outer end of said levers and providing an abutment for said yielding means.

29. In a clutch, the combination of a driving flywheel and driven shaft, a driven disc carried by said shaft, a pressure plate around said shaft, levers driven by said flywheel having their ends surrounding said shaft, fulcrum means for said levers, yielding means adapted to actuate said levers for moving said pressure plate, said yielding means including a spring engaging the inner ends of said levers, and spring abutment means engaging the outer end portion of said levers.

30. In a clutch, the combination of a driving flywheel and driven shaft, a driven disc carried by said shaft, a pressure plate around said shaft, levers driven by said flywheel having their ends surrounding said shaft, fulcrum means for said levers, yielding means adapted to actuate said levers for moving said pressure plate, said yielding means including a spring engaging the inner ends of said levers, and spring abutment means engaging the outer end portion of said levers, said lever fulcrum means engaging said levers at a point intermediate the ends thereof.

ANDRE J. MEYER.